(12) United States Patent
Hammer

(10) Patent No.: US 6,470,834 B1
(45) Date of Patent: Oct. 29, 2002

(54) METHOD AND DEVICE FOR EXPLOITING HEAT IN COMBUSTION GASES

(76) Inventor: Rolf H. Hammer, P.O. Box 515 Hunn, N-2803, Gjøvik (NO)

( * ) Notice: Subject to any disclaimer, the term of this patent is extended or adjusted under 35 U.S.C. 154(b) by 0 days.

(21) Appl. No.: 09/856,137
(22) PCT Filed: Nov. 22, 1999
(86) PCT No.: PCT/NO99/00352
§ 371 (c)(1), (2), (4) Date: Jun. 25, 2001
(87) PCT Pub. No.: WO00/31484
PCT Pub. Date: Jun. 2, 2000

(30) Foreign Application Priority Data

Nov. 23, 1998 (NO) .......................................... 19985465

(51) Int. Cl.⁷ .............................................. F28D 15/02
(52) U.S. Cl. ................... 122/7 R; 122/4 D; 165/104.18
(58) Field of Search ................................. 122/7 R, 4 D, 122/166.2; 432/14, 17, 27, 187, 194, 188, 223, 200, 177, 28; 165/104.15, 104.18

(56) References Cited

U.S. PATENT DOCUMENTS

| | | | | |
|---|---|---|---|---|
| 4,076,504 A | * | 2/1978 | Oshida et al. | 432/27 |
| 4,320,796 A | * | 3/1982 | Smith | 165/104.18 |
| 4,369,834 A | | 1/1983 | Meunier | |
| 4,776,388 A | | 10/1988 | Newby | |
| 5,012,750 A | * | 5/1991 | Sheely et al. | 122/4 D |
| 5,033,413 A | * | 7/1991 | Zenz et al. | 122/4 D |
| 5,450,802 A | * | 9/1995 | Horvath et al. | 122/4 D |
| 5,566,750 A | | 10/1996 | Arpalahti | |

FOREIGN PATENT DOCUMENTS

| | | |
|---|---|---|
| DE | 1102785 | 12/1955 |
| GB | 1588310 | 4/1981 |
| NO | 145632 | 4/1981 |

OTHER PUBLICATIONS

Derwnet's abstract No. 96–9229/01, week 9601, Abstract of RU, 2034191 (Filimonov) Apr. 30, 1995 whole doc general state of the art.

Derwent's abstract No. 78615 E/37, week 8237, abstract of SU, 881516 (Avtorempromproekt) Nov. 15, 1981 whole doc.

* cited by examiner

Primary Examiner—Gregory Wilson
(74) Attorney, Agent, or Firm—Christian D. Abel

(57) ABSTRACT

The invention relates to a method and a device for utilizing the heat of flue gases from combustion apparatus while simultaneously removing condensable elements from the flue gases and reducing the corrosivity of the flue gases. The method is applicable to all types of combustion apparatus where a combustion zone generates hot flue gases that are cooled in one or more heat exchangers that transfer the utilizable heat to a liquid or a gas. The method is also suitable for apparatus with considerable load fluctuations, where the fuel supply must be adjusted to the heat load. This is achieved by separating the flue gases from the heat exchangers by cooling the flue gases by means of a particulate material (2, 13) which absorbs the condensable substances, and by circulating the particulate material between the flue gases and heat exchangers (10) that transfer heat to the hot liquid or gas.

9 Claims, 4 Drawing Sheets

METHOD AND DEVICE FOR EXPLOITING HEAT IN COMBUSTION GASES

The invention relates to a method for utilising the heat in the flue gas from incinerator plants, such as, e.g., steam boiler plants and hot water boiler plants with varying loads while simultaneously removing condensable elements in the flue gas and substantially reducing the flue gas's corrosive activity The method may be employed in all types of incinerator plant where a combustion zone produces hot flue gases which are cooled in one or more heat exchangers which transfer the flue gas's exploitable heat into a liquid or gas. The method is also well-suited to incinerator plants with considerable load variations which require the amount of fuel to be adjusted to keep pace with the heat requirement.

BACKGROUND AND THE PRIOR ART

Hot flue gases from incinerator plants which are fired by solid fuels such as biomass, household rubbish, wood chips, industrial waste or hydrocarbons in solid or liquid form, often contain condensable components with high boiling points. These elements will condense on surfaces which have a lower temperature than their evaporation point, thus forming deposits. These elements are often called slag formers, and exist in solid and liquid form. The deposits are always heat-insulating and usually corrosive. In addition, the flue gases contain other components which are often corrosive and/or erosive.

In incinerator plants which are fired by biomass, household rubbish or industrial waste, melted salts constitute a particularly problematic condensate. The salts will condense on surfaces which have a lower temperature than the evaporation point. In conventional boiler plants the hot flue gases will be passed to heat exchangers, such as, e.g., preheaters, evaporators and superheaters which produce water vapour, where the gases exchange their heat content for another heat-transferring medium (water or steam). In such plants the salts will be deposited on heat exchanger surfaces and other walls which are sufficiently cold. As time goes by the deposits become so thick that they will create a problem, since the deposits substantially reduce the heat transfer from the flue gas to the other heat-transferring medium in the heat exchangers. In some cases the situation may also arise that the deposits become so large that they physically block the passage of the flue gases. Regular stoppages are therefore necessary in order to clean deposits from the relatively cold parts of the plant and the heat exchangers. An additional factor is that in conventional plants, the plants have had to be overdimensioned in order to increase the cooling capacity to counteract the reduction in the heat transfer resulting from the deposits, and in some cases expensive purification plants have had to be provided. Furthermore, a reduction in the heat transfer will have the result that the flue gases are not cooled to the same extent, thus reducing the plant's fuel economy and the discharge of polluting gases will be greater.

In addition to this, the salts in particular, but also other components in the flue gases have a corrosive effect on the walls of the plant and the heat exchangers. This entails a further need for cleaning and maintenance and not infrequently considerable repair costs for these steam boiler plants and/or hot water boiler plants. Another consequence of reduced heat transfer (cooling) as a result of the build-up of deposits is that the temperature of the gases increases. A local rise in temperature in corrosive environments often leads to increased repair costs and to the choice of more corrosion-resistant and thus more expensive materials in the plant. Another effect of the flue gases' rise in temperature is that the composition is changed. This may lead to problems with undesirable gases such as, e.g., $NO_X$.

The production in a heating plant or thermal power plant has to be regulated in step with the consumption of hot water and/or steam. In the case of supplies to the processing industry in particular the load variations can be substantial. In conventional incinerator plants the heat exchangers are usually fixed installations with a constant surface, with the result that large sections of the plants receive almost constant capacity. When the cooling capacity is not proportional with the amount of fuel supplied, the flue gas's temperature will normally fall when the power is reduced. As already mentioned, variations in the flue gases' temperature are undesirable since they result in an alteration in combustion conditions and thereby variations in the degree of combustion and discharge of polluting gases. This means that conventional plants are lacking in flexibility with regard to variations in load.

Due to the increasingly stringent environmental requirements in recent times the combustion is performed with such a low level of solid soot particles and other impurities that many of the fixed fuel fractions are directly sublimated into the gas phase. Under the given conditions, these gases may condense into very small crystals or form an amorphous dust. This dust lies like a relatively thin but effectively heat-insulating layer on walls and surfaces in the plant. This increases the need for further cleaning of the plant. Examples are known of modern boilers for ships where the need to stop production in order to clean this dust layer has increased by a factor of 15 to 20-fold.

The use is known from Norwegian patent application no. 971603 from ABB Fläkt AB of an adsorbent in powder form for condensable components in hot industrial waste gas for cleaning condensate from the surfaces of a boiler. The adsorbent is mixed with the waste gas stream before the boiler and is carried along with the gas stream. When the gas reaches the cold walls the condensable components will be condensed on the walls of the cooler and the adsorbent will adsorb the condensate, thereby cleaning the walls of the cooler. This method. however, will not work for salt deposits as they are too hard. Condensable salt deposits should be stopped before they reach the cold surfaces in the plant.

U.S. Pat. No. 4,702,818 from Oyamoto et al. concerns a method for recovering heat from a hot gas containing tar substances. The hot gas is first passed through a layer of hot solid particles in a jet cooler, thus forming a fluidised bed where the particles are carried along with the gas stream and cooled together with the gas by means of a plate heat exchanger, with the result that a first portion of the tar substances is absorbed on the solid particles. In the next stage the gas is passed through a tar cooler where the gas is sprayed with tar drops which absorb a second portion of the tar substances in the gas before the gas is cooled in a third stage where it is sprayed by fine tar drops which absorb the last portion of the tar substances,

THE OBJECT OF THE INVENTION

It is an object of the present invention to provide a method which utilises the heat from flue gases flowing out of an incinerator plant and which reduces and/or eliminates the above-mentioned disadvantages.

It is also an object of the present invention to provide embodiments of steam boiler plants and/or hot water boiler plants for implementing the method which are flexible with regard to varying loads.

DESCRIPTION OF THE INVENTION

The objects of the present invention are fulfilled by a method and plants as indicated in the attached patent claims, and which are described in detail below.

The present invention is based on the idea that the above-mentioned drawbacks of corrosive activity and deposits of condensable components in the flue gases can be eliminated and/or substantially reduced by separating the hot flue gases from the heat-transferring of the heat exchangers to another heat-transferring medium. This may be achieved, e.g., by the hot flue gases giving up heat to a cold particulate material which is transported away from the zone where it comes into contact with the flue gases to a zone where it comes into contact with one or more heat exchangers where the material's heat is transferred to another heat-transferring medium (e.g. water or steam). Another heat-transferring medium should be understood to be a gas or liquid which absorbs the flue gas's heat and which transfers or transports the heat to a location where it can be turned to account such as, e.g., a steam turbine, radiator, etc. After the particulate material has given up heat to the other heat-transferring medium, thereby becoming cooled it is returned to the zone where it comes into contact with hot flue gases for reheating. In other words the particulate material is passed in a closed loop where it transfers the heat from the flue gases to the other heat-transferring medium, while at the same time the particulate material also acts as a filter for the flue gases by absorbing all or parts of the condensable compounds and solid suspended particles (dust) in the flue gases.

Several ways may be envisaged of contacting the flue gas with the particulate material. For example, in a first preferred embodiment of the present invention the gas is passed through a static bed of the particulate material, and in a second preferred embodiment the particulate material is sprinkled or sprayed over the gas which passes in a shaft/channel and is collected in the bottom thereof. Combinations of these two methods and other alternatives are, of course, also conceivable. Depending on the requirements with regard to the temperature of the other heat-transferring medium, it may be envisaged that the heat in the flue gases is removed in one or more stages, thus providing one or more fractions of the other heat-transferring medium with different temperatures. It may also be envisaged that only one stage is employed where the flue gases are cooled and purified by a particulate material and that the residual heat in the flue gas is removed by means of conventional heat exchangers such as, e.g., preheaters, economisers, evaporators and superheaters. However, before the flue gas comes into contact with conventional heat exchangers or other surfaces in the plant which are sufficiently cold to condense the condensable compounds, it should have been cooled and purified by means of the particulate material to a sufficient degree to avoid the above-mentioned problems.

It is also possible to begin the purification and cooling of the flue gases inside the actual combustion chamber. In this case a sprinkler loop, e.g., may be employed where a particulate material is sprinkled/sprayed from above down on to the combustion zone. In this case it is an advantage to have the fuel lying on a bed of the particulate material and for the material to be circulated past one or more heat exchanger(s), thus enabling the material's heat content to be transferred to the other heat-transferring medium.

In addition to avoiding the above-mentioned problems by the heat in the flue gases being absorbed in this fashion, the additional advantage is obtained that the plants become highly flexible with regard to adapting their operation to varying requirements. If the requirement declines with the result that the supply of fuel has to be reduced, with plants according to the present invention the cooling of the flue gases can easily be reduced by reducing to a corresponding degree the amount of particulate material which is circulating and the amount of the other heat-transferring medium passing through the heat exchangers. The same temperature conditions are thereby obtained in the plant, with the result that it is operated with the same efficiency and with the same control of emissions of polluting gases. In those cases where the plants are also equipped with a sprinkler loop in the combustion chamber, it is also possible to increase the supply of fuel to a certain extent without an increased risk of local overheating by increasing the circulation rate in the sprinkler loop, thus increasing to a corresponding degree the cooling of the flue gases in the combustion chamber. The limiting factor of course is that the circulation rate cannot be increased to such an extent that there is a risk of smothering the combustion. On account of the possibility of achieving this kind of flexibility, all plants according to the invention may be equipped with means for regulating the circulation rate of the particulate material and the flow rate of the other heat-transferring medium through the h changers. These regulating means are not shown in the figures.

Another advantage of the present invention is that since the deposits are laid on the particulate material, this makes it possible to clean the plant of deposits without the need to stop the operation of the plant. This can be easily implemented by continuously cleaning/regenerating the particulate material or alternatively replacing it, either completely or partially, while the plant is in operation.

A further advantage of plants according to the invention is that the risk of overheating of the other heat-transferring medium in the event of a power failure is greatly reduced since the transport system for the particulate material will stop and such materials have good heat-insulating properties. The risk of steam explosions in the plant is thereby eliminated. In addition, by supplying the plants with an "emergency box" with the particulate material, cooling of the combustion zone and/or other parts of the plant can also be provided, since the emergency box arranges for the plant to be sprinkled in the event of a power cut.

All types of particulate material may be used which have the ability to absorb the condensable compounds in the flue gases from such incinerator plants as long as the material can withstand the temperatures in the plant without melting or beginning to sinter, etc. The material must be a freely flowing particulate material at all temperatures in the plant. If the particulate material is sprinkled on the flue gas it is important that this should be done in such a way that all the gas comes into contact with the material. In other words, the sprinkling should be carried out in such a manner that the cross section of the channel/shaft in which the gas flows is covered.

Examples of incinerator plants which are well-suited for implementation of the present invention are industrial heating plants, including steam plants, district heating plants with hot water or steam, together with power heating plants with steam-driven generators.

EMBODIMENTS

The invention will now be described in more detail with reference to figures and preferred embodiments of plants according to the invention.

Figure 1:
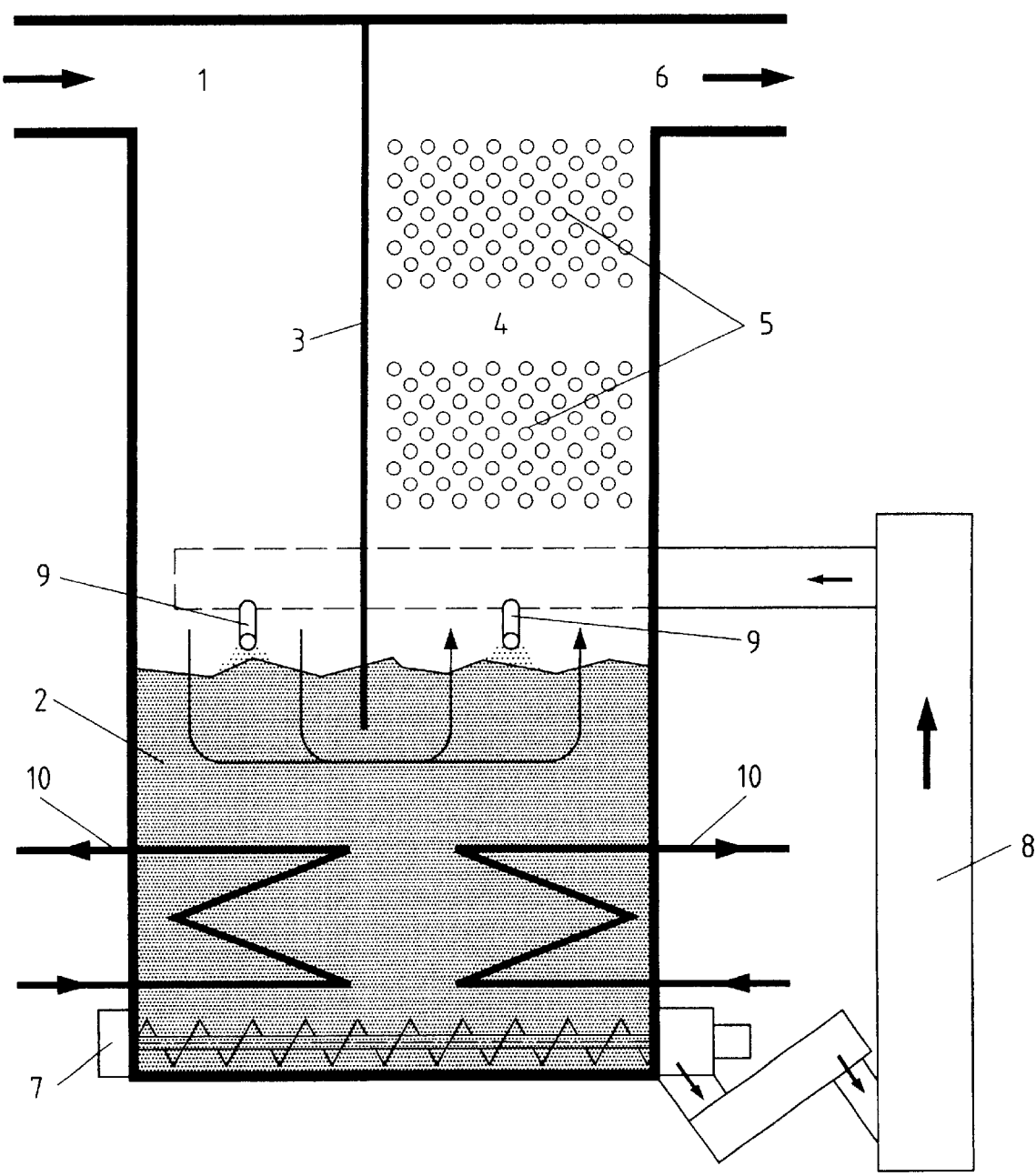
FIG. 1 is a principle drawing of a first preferred embodiment of a steam boiler plant according to the invention where the flue gas is cooled first in a sand bed and then in a conventional convection stream.

In the first preferred embodiment of a boiler plant according to the invention illustrated in FIG. 1, the steam boiler plant consists of a rectangular vertical box which is divided into two channels. Hot flue gas from a combustion zone enters at the top of the first channel 1 and flows downwards towards a static bed of cold sand 2. The inner wall 3 of the channel 1 extends some distance down into the sand bed 2, thus forcing the flue gas down into the sand, round the end of the inner wall 3 before emerging from the sand and entering the second channel 4. After its residence in the sand bed the now partly cooled flue gas flows upwards in the channel 4, through two zones with conventional heat exchangers 5 where the residual heat in the flue gas is transferred to the other heat-transferring medium and on to the outlet 6 where cold flue gas is discharged from the boiler plant. The sand is continuously recirculated by being removed from the bottom of the boiler plant by means of a screw conveyor 7, transported by suitable transport means 8 to one or more inlets 9 where the sand is returned to the sand bed. The sand on the top of the bed 2 which comes into contact with the hot flue gas is naturally heated by the gas. Due to the circulation of the sand, however, fresh cold sand will always be filled on the top of the sand bed, while the hot sand sinks down in the bed where it comes into contact with one or more heat exchangers 10 which transfer the sand's heat content to the other heat-transferring medium. The sand is thereby cooled with the result that the sand in the bottom of the bed 2 is cold.

In this case it is important to adapt the sand's circulation rate so that the flue gas is sufficiently cooled during its residence in the sand bed 2 for the condensable compounds to be condensed on the sand particles and for the corrosive activity of the flue gas to be sufficiently reduced for the conventional heat exchangers 5 to get rid of the problems of corrosion. The transport system for the sand is equipped with means for regulating the sand's circulation rate and the heat exchangers are equipped with means for regulating the flow rate of the other heat-transferring medium. These are not illustrated in the figure. For steam boiler plants which are fired by solid fuel the problems of deposits are particularly great in the temperature range 500–1000° C., and therefore the temperature of the flue gas after its residence in the sand bed 2 should be under 500° C.

Figure 2:
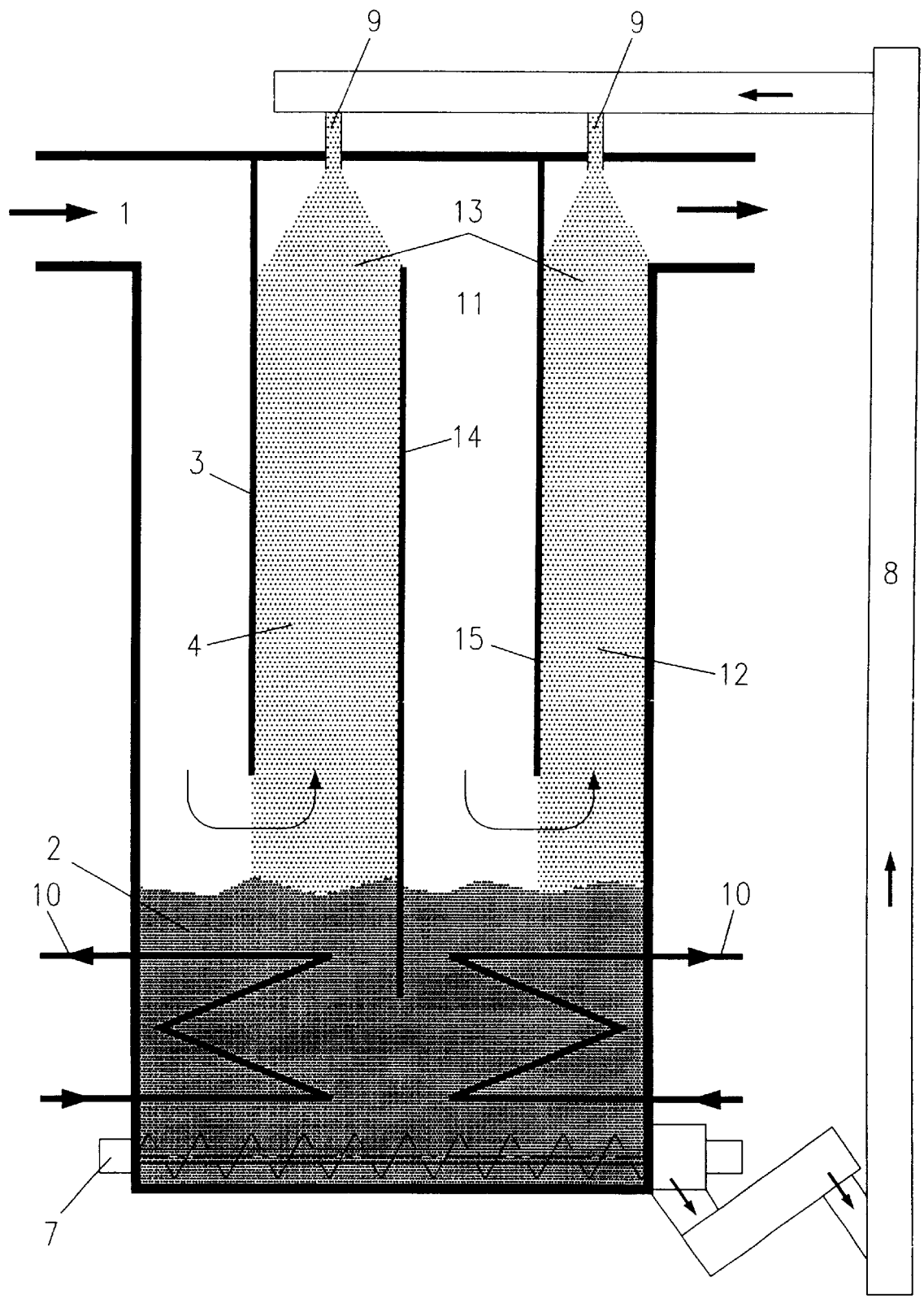
FIG. 2 is a principle drawing of a second preferred embodiment of a steam boiler plant according to the invention where the flue gas is cooled by sand which is sprinkled over the flue gases in two stages.

In the second preferred embodiment of a boiler plant according to the invention which is illustrated in FIG. 2, the boiler plant also consists of a vertical rectangular box where a static sand bed 2 lies in the bottom of the box and hot flue gas enters at the top of a vertical channel I. Unlike the first preferred embodiment, however, the hot flue gas is not forced down into the static sand bed 2, but instead is passed directly up the second vertical channel 4 where it is sprinkled with cold sand 13 on the way down the channel. The flue gas is thereby cooled on the way up the channel 4 by the cold sand falling down through the channel 4. The sand which falls down the channel 4 is heated in turn by the flue gases, with the result that it is hot when it reaches the sand bed 2 in the lower part of the boiler. This represents a first stage in the cooling of the flue gas. The flue gas will then pass down into a third channel 11 before again rising up in a channel 12 where it is again sprinkled with sand 13. This represents a second stage in the cooling of the flue gases, replacing the conventional beat exchangers employed in the first embodiment, Analogously with the circulation of the sand in the first preferred embodiment presented in FIG. 1, the sand will be circulated past one or more heat exchangers 10 where it is cooled, transported by suitable means 7,8 to the top of the boiler and sprinkled once again via the inlets 9. This embodiment of the invention too is equipped with means for regulating the circulation rate of the sand and the flow rate of the other heat-transferring medium in the heat exchangers.

Due to the fact that the removal of the heat content in the flue gases is divided into two stages, the temperature of the other heat-transferring medium, which is heated in the heat exchangers 10 which are in contact with the sand which has passed through the channel 12, will be lower than the medium which has been heated by the sand which has passed through the channel 4. In many cases it can be expedient for the boiler plant to supply a heat-transferring medium with two temperatures, e.g. both steam and hot water, It is, of course, possible to cool the flue gas completely in one stage, or the process can be divided into several stages if desired, An advantage is obtained, however, by dividing the cooling process into at least two stages as the height of the plant is thereby reduced, The cooling of the gases is proportional with the sand's length of fall and thus the greater the drop in temperature which the flue gas has to undergo, the longer the fall the sand must have. Another way of increasing the cooling is to increase thermal contact between the sand and the flue gas by increasing the gas's flow rate.

The velocity of the flue gas can be increased right up to the time when the sand particles begin to float and are carried along with the flue gas. The sand particles thereby obtain a longer residence time in the gas. In addition the heat transfer between the particles and the flue gas increases with the increase in gas flow rate (relatively between particle and gas) and with a decrease in the diameter of the particles (the smaller the particle, the greater the heat transfer coefficient). It may be envisaged that an increase in thermal contact between the particles and the flue gas can be implemented by altering the channel's cross sectional area, e.g. by making one of the walls in the channel slidable or giving the plant replaceable channels with different cross sections, and/or by using sand with different particle sizes. The use of fine-particulate sand in particular can be highly effective. In this case the advantages are gained both of the effect of the increase in heat transfer due to small particle diameter while at the same time the particles have a lower rate of fall down the channel.

Figure 3:
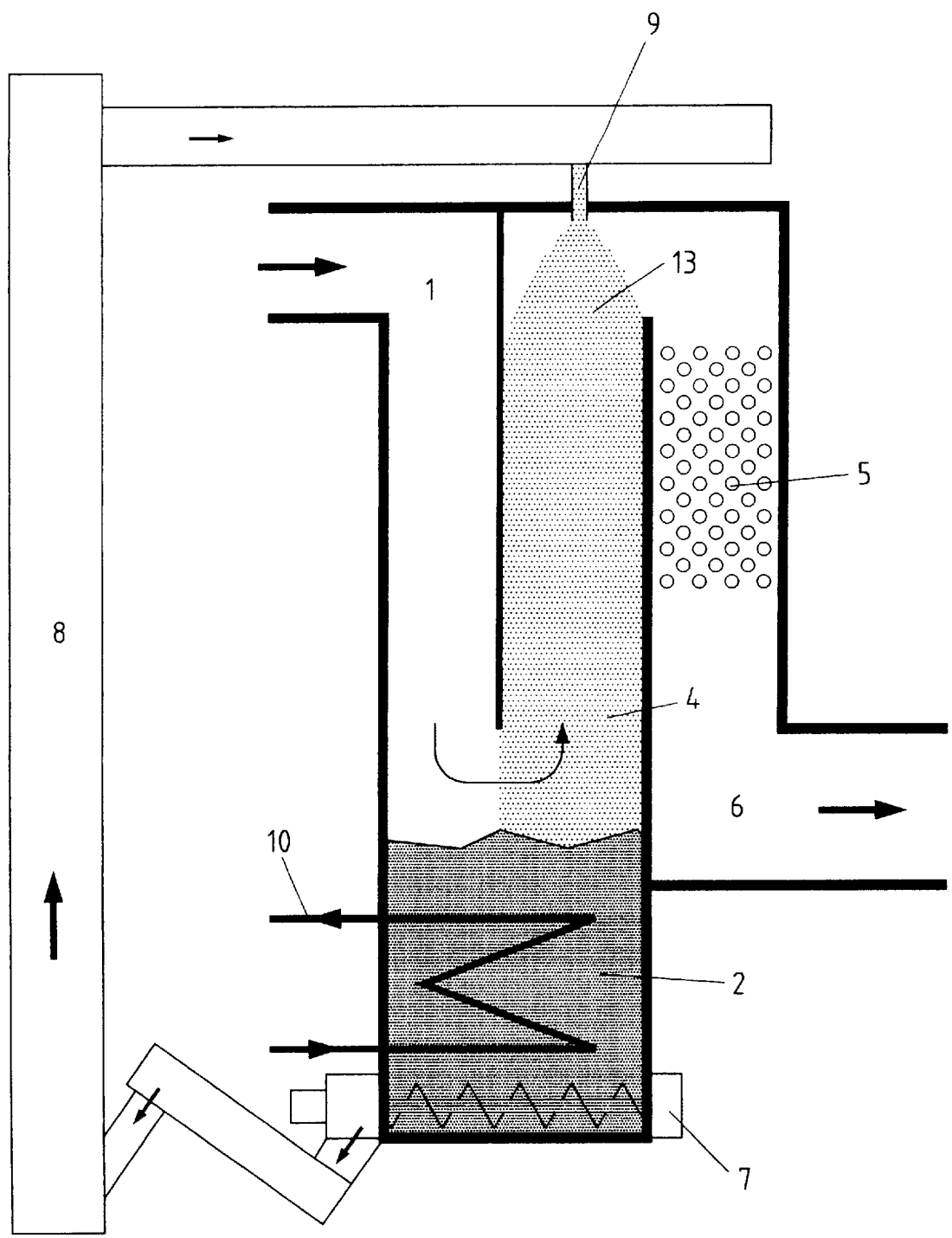
FIG. 3 is a principle drawing of a third preferred embodiment of a steam boiler plant according to the invention where the flue gas is cooled first by sand which is sprinkled over the flue gases and then by a conventional convection stream.

The third preferred embodiment of the boiler plant illustrated in FIG. 3 is a combination of the first and second embodiments where the first cooling stage is composed of cold sand which is sprinkled over the hot flue gas and the second stage is composed of conventional heat exchangers. Otherwise everything is analogous with the two first preferred embodiments.

Figure 4:
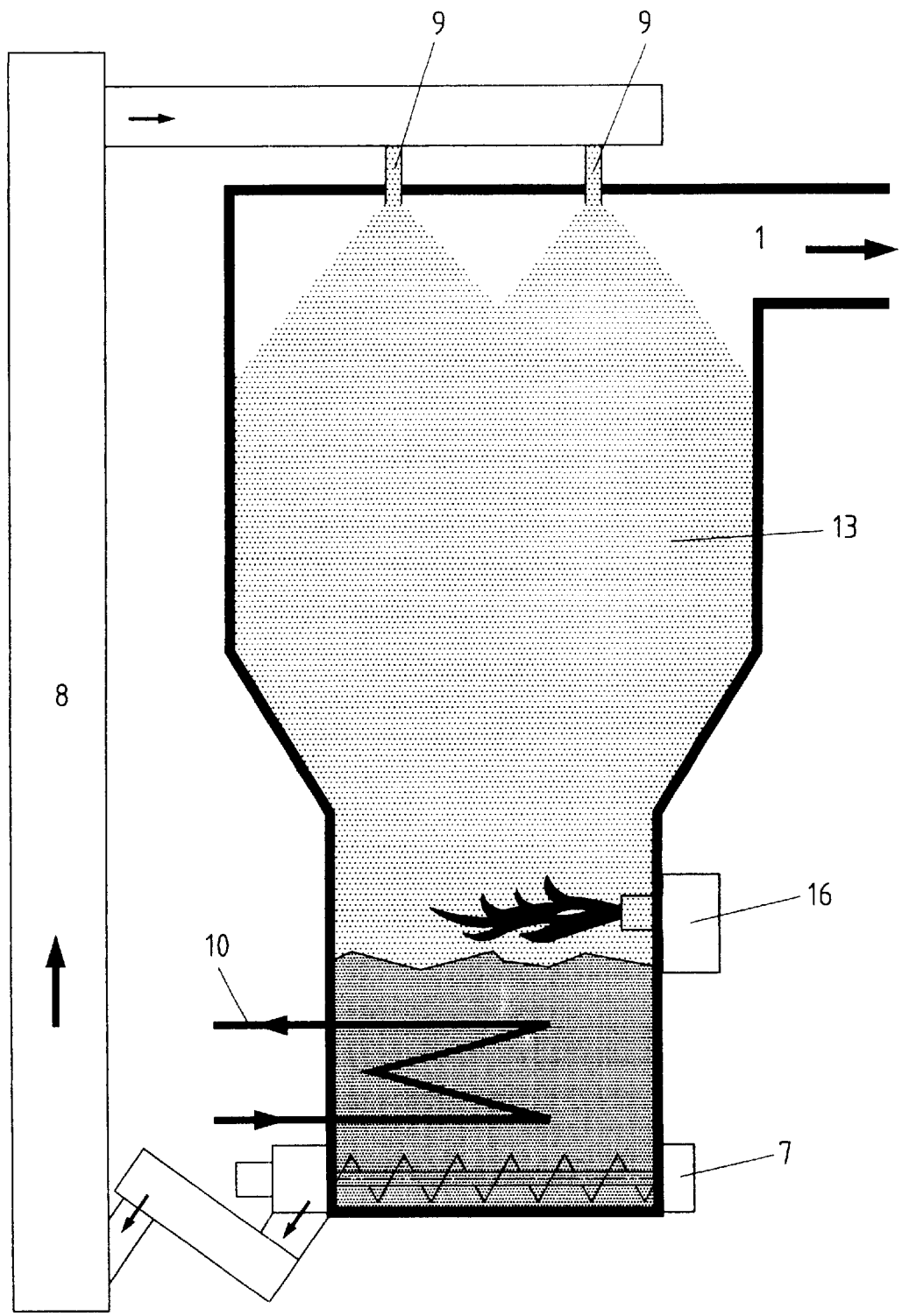
FIG. 4 is a principle drawing of a preferred embodiment of a combustion chamber which is equipped with a sprinkler loop.

FIG. 4 illustrates a preferred embodiment of the sprinkler unit for the combustion chamber. In the figure a transport system 7, 8 and 9 is illustrated for the sand which is fully analogous with the system which is described above for the preferred embodiments of the steam boilers. The sand is removed at the bottom of the chamber by means of a screw conveyor 7, passed to the inlets 9 and sprinkled on the chamber so that the sand 13 drops down to the sand bed 2. Here too it is possible to remove heat by means of beat exchangers 10 down in the sand bed. In the figure a conventional burner 16 and the outlet 1 for the flue gases are illustrated. A combustion chamber of this type which is connected to a boiler plant as in the second preferred embodiment presented in FIG. 2 is particularly flexible with regard to its ability to adapt the operation of the plant to varying requirements. It is, of course, also possible to employ a narrow combustion chamber instead of the wide one in FIG. 4, and this can be relevant when several chambers are connected. Thus many modifications are possible within the scope of the invention.

What is claimed is:

1. A method for utilizing the heat in flue gases which contains condensable compounds, solid suspended particles and dust for production of hot liquids and/or gases, where in the condensable compounds, solid suspended particles and dust are made harmless by contacting the flue gases with a cold particulate material which is sprinkled and/or sprayed over the flue gas which arises in a first vertical zone in order to cool the flue gases and simultaneously filtrate/condense the flue gases content of condensable compounds, solid suspended particles and dust, characterized in that after contacting the flue gases in the first zone, the heated particulate material is collected at the bottom of the vertical first zone and transported to a second zone where it is contacted with, heat transforming surfaces of one or several heat exchangers submersed into the particulate matter for transferring the heat which the material gained from the flue gases to one or several external heat carrying media in liquid or gas phase, and in that after passing the one or several heat exchangers in the second zone, the cold particulate material is circulated back to be sprinkled/sprayed above the flue gas in the first zone.

2. A method according to claim 1, characterized in that the cooling and filtration/condensation of the flue gases are regulated according to variations in the heat production by regulating the circulation rate of the particulate material accordingly.

3. A method according to claim 2, characterized in that sand is used as the particulate material and that the sand is continuously replaced/cleaned with fresh sand during operation in order to keep the level of deposits on an acceptable low level.

4. A method according to claim 3, characterized in that an additional cooling and filtration/condensation step is provided by sprinkling/spraying the combustion zone.

5. A steam boiler plant and/or hot water boiler plant for production of hot liquid and/or gas, wherein hot flue gas from a combustion zone transfers its heat content to an external heat-transferring medium in one or more heat exchangers, each of which represents a temperature stage, characterized in that the plant comprises;

an inlet for the flue gas from the combustion zone, a first cooling and filtration/condensation of the flue gas which comprises a first vertical channel, (1) which transports the flue gas down to a bed (2) of a particulate material, a second vertical channel (4) which transports the flue gas up from the bed, a partition (3) between the fiat and second channels (1, 4) which does not reach all the way down to the bed, one or more nozzles (9) which sprinkle the flue gas which rises up in the second channel (4) with the particulate material, a second cooling and cleaning stage for the flue gas analogous with the first stage, comprising a third and fourth vertical channel (11, 15), one or more nozzles (9) at the top of the fourth channel (15), and an outlet (6) for the flue gases at the top of the fourth channel (15), one or more heat exchangers (10) placed well down in the bed (2) of the particulate material, and a transport system (7, 8) which passes the particulate material in a cycle between the nozzles (9) where it sprinkles the flue gas in the second and fourth channels (4, 15), aid the lower pat of the bed where the heat which is transferred from the flue gas to the particulate material is transferred on to an external heat-transferring medium in the heat exchangers (10).

6. A steam boiler plant and/or hot water boiler plant according to claim 5, characterized in that the second cooling stage is composed of conventional heat exchangers.

7. A steam boiler plant and/or hot water boiler plant according to claim 6, characterized in that the combustion chamber is also equipped with a sprinkler loop for the particulate material.

8. A steam boiler plant and/or hot water boiler plant according to claim 7, characterized in that the transport system for the particulate material comprises a screw conveyor (7) located in the bottom of the bed (2), transport means (8) which transports the material to one or more inlets and/or nozzles (9).

9. A steam boiler plant and/or hot water boiler plant according to claim 8, characterized in that the particulate material is sand.

* * * * *